United States Patent [19]

Mecherlen

[11] 4,120,237
[45] Oct. 17, 1978

[54] VERTICAL BARBECUE

[75] Inventor: Otto Mecherlen, Queens Village, N.Y.

[73] Assignee: The Raymond Lee Organization, Inc., New York, N.Y.

[21] Appl. No.: 786,268

[22] Filed: Apr. 11, 1977

[51] Int. Cl.² ............... A47J 33/00; A47J 37/07
[52] U.S. Cl. ............................. 99/340; 99/390; 99/391; 99/402; 126/9 R; 126/25 R
[58] Field of Search ............ 99/421 HV, 339, 340, 99/427, 421, 390, 391, 402; 126/25 R, 9 R, 25 A

[56] References Cited

U.S. PATENT DOCUMENTS

| | | | |
|---|---|---|---|
| 1,836,894 | 12/1931 | Bedigian | 126/25 R |
| 2,379,239 | 6/1945 | Krebs | 99/421 HV |
| 3,182,585 | 5/1965 | Rensch et al. | 99/421 H |
| 3,611,912 | 10/1971 | Choc | 99/421 HV |
| 3,742,838 | 7/1973 | Luschen | 126/25 |
| 3,867,877 | 2/1975 | Zajc | 99/421 HV |

OTHER PUBLICATIONS

Roto–Broil Corp. of America, 10–1956.

*Primary Examiner*—Harvey C. Hornsby
*Assistant Examiner*—Timothy F. Simone
*Attorney, Agent, or Firm*—Howard I. Podell

[57] ABSTRACT

A portable barbecue unit the housing of which is a case fitted with a hinged cover inside of which are a pair of containers which serve as charcoal burner units, each fitted with one side formed as a grate. The burner units may be mounted, with the cover opened, so that the grates of the two burner units face each other in spaced vertical array. A hinged grill may be fixed to a handle that is rotatably mounted in attachable brackets to the housing between the erected burner units. Alternately the burner units may be mounted side by side in the container with the grates forming a continuous surface on which the grill may be rested. Each burner unit is shaped as a box with one side hinged to the burner unit for replacement of charcoal.

2 Claims, 5 Drawing Figures

VERTICAL BARBECUE

SUMMARY OF THE INVENTION

My invention is a portable barbecue unit the housing of which is a case fitted with a hinged cover inside of which are a pair of containers which serve as charcoal burner units, each fitted with one side formed as a grate. The burner units may be mounted, with the cover opened, so that the grates of the two burner units face each other in spaced vertical array. A hinged grill may be fixed to a handle that is rotatably mounted in attachable brackets to the housing between the erected burner units. Alternately, the burner units may be mounted side by side in the container with the grates forming a continuous surface on which the grill may be rested. Each burner unit is shaped as a box with one side hinged to the burner unit for replacement of charcoal.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
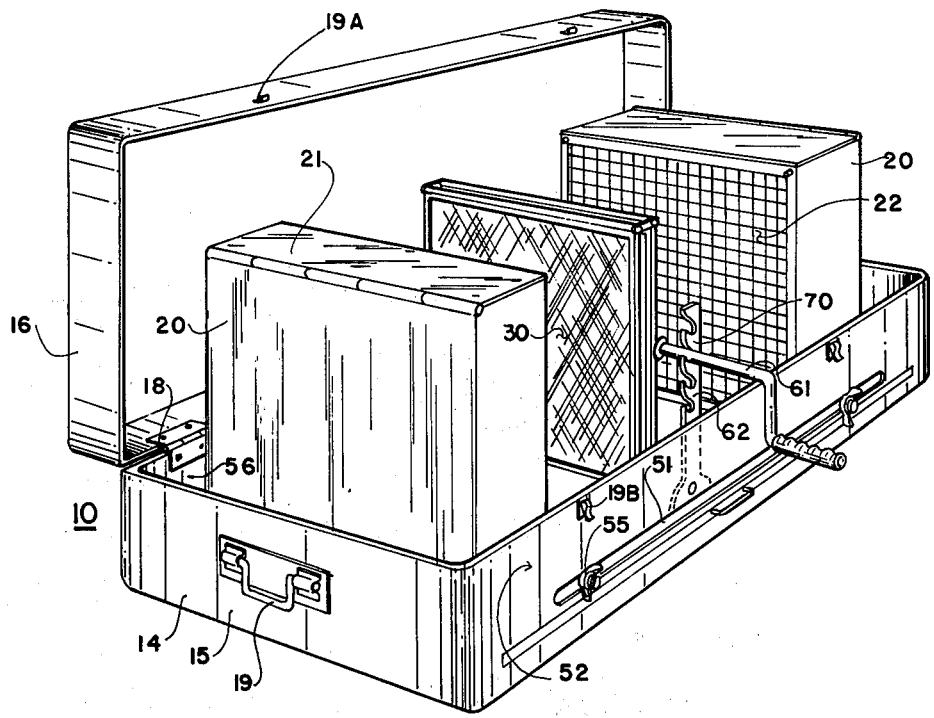
FIG. 1 is a perspective view that illustrates the invention in use.
Figure 2:
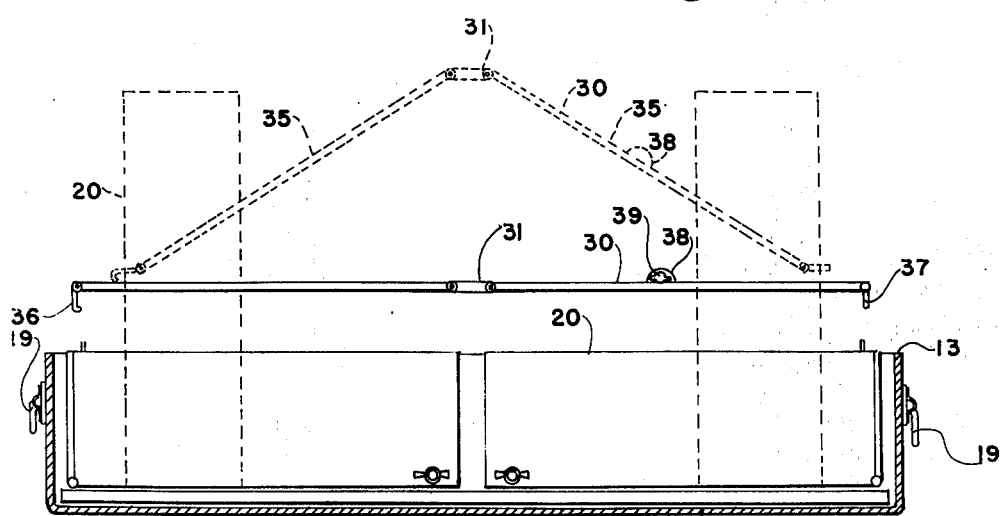
FIG. 2 is a side sectional view of the base unit of the invention.
Figure 3:
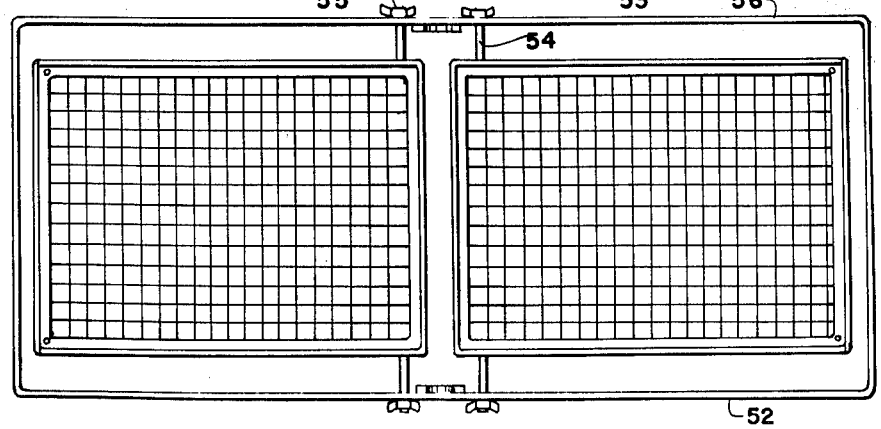
FIG. 3 is a plan view of the opened base unit.

Turning now descriptively to the drawings, in which similar reference characters denote similar elements throughout the several views, FIGS. 1-4 illustrate the barbecue unit 10, the housing 14 of which is a base unit 15 in the form of an open box pivotally mounted on its rear wall 56 by hinges 18 to a cover unit 16, with cover unit 16 and base unit 15 fitted with mating latches 19A, 19B respectively for holding the cover latched to the base unit so as to enclose all the operating parts as a carrying case. Handles 19 are hinged to external opposed sides of the base unit 15, for carrying purposes.

Two burner units 20 of equal size fit in the base unit 15, with each burner unit in the form of a closed box and fitted with one hinged side 21 and one face side 22 formed as an open grid so as to serve as a grate when charcoal is burned inside of the burner unit 20. Boxes 20 are of a size so that two boxes may be fitted in the base unit 15 with the two grate sides 22 forming a continuous surface slightly above the level of the plane of the rim 13 of the sides of the opened base unit 15.

A through slot 54 extends along the front side 52 and rear side 56 of the base unit 15 parallel to the base panel 53 of the base unit, with a threaded stud 54 fixed to a front side of each burner unit projecting through slot 51 and fixed in position by wing nut 55. With nuts 55 loosened, each burner unit may be rotated to a vertical position of the grate face side 22, with grate face sides 22 facing each other and separated by a space sufficient to rotate a grill 30 fixed to rotisserie bar 61 which is mounted in attachable brackets 70. Wing nuts 55 may be tightened to hold the burner units in the vertical position.

Grill 30 is formed of two open grid plates 35 each pivotally joined at one end to a link 31 and each fitted at the other end with mating latching fasteners 36, 37. A clip 38 is fixed on opposed sides of one grid plate 35 and formed with a non-circular hole 39 shaped with radial recesses. Rotisserie bar 61 is formed with radial detents 64 located to engage radial recesses of hole 39 when bar 61 is slid through hole 39 so that, with both plates 35 latched together by latching fasteners 36, 37 grill 30 may be non-rotatably fixed to bar 61.

Each of two brackets 70 may be detachably mounted against the inside surface of rear wall 56 and front wall 52 to extend vertically above rim 13, with each bracket 70 formed with a plurality of recesses 73 open to a side of the bracket for alternate rotatable mounting of rotisserie rod 61, between vertically oriented burner units 20.

Rotisserie bar 61 is bent at one end to form a crank shaped handle section 68. Bracket 70 is formed with a through hole 76 and an open slot 77 for engagement to a fixed pin 78 and a bolt 79 fastened through a rear or front wall 56 or 52 respectively.

A slidable tray 90 is mounted below burner units 20 and fitted with an external handle 91 for removal through a slot in the forward wall 52 for retention of drippings from meat in grill 30.

Figure 4:
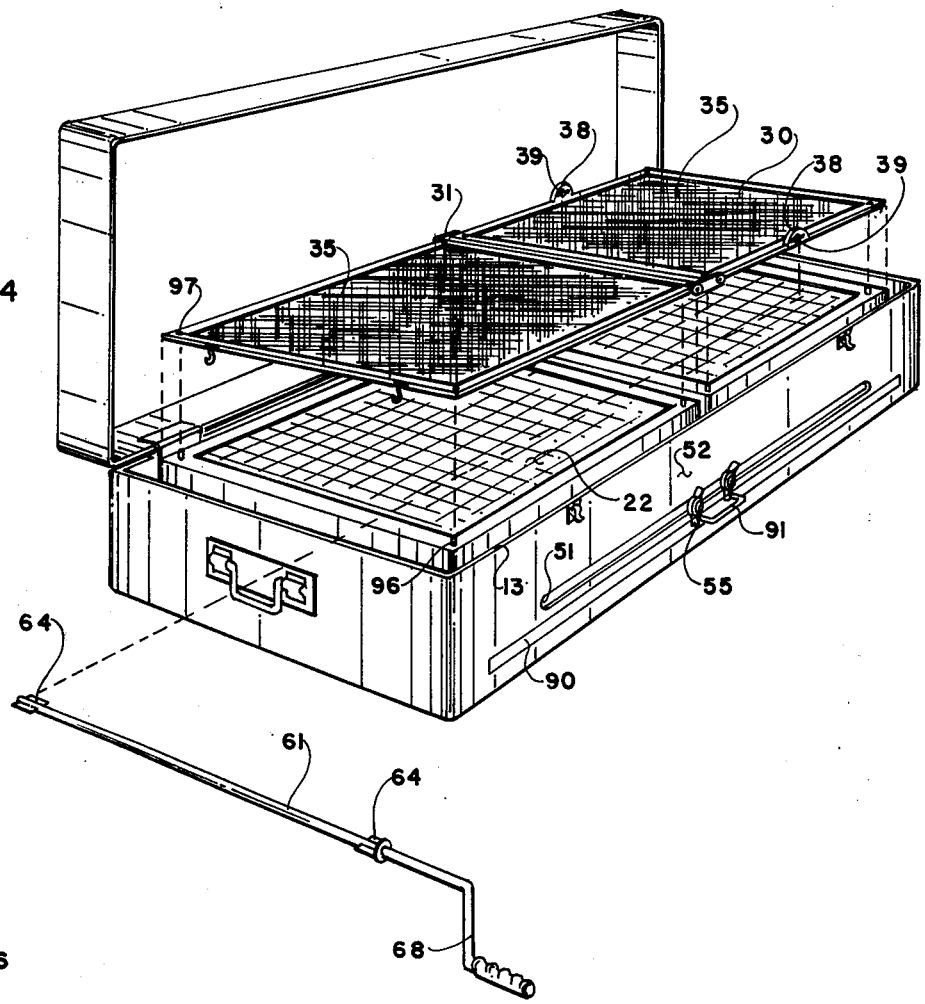
FIG. 4 is a perspective view of the opened unit.
Figure 5:
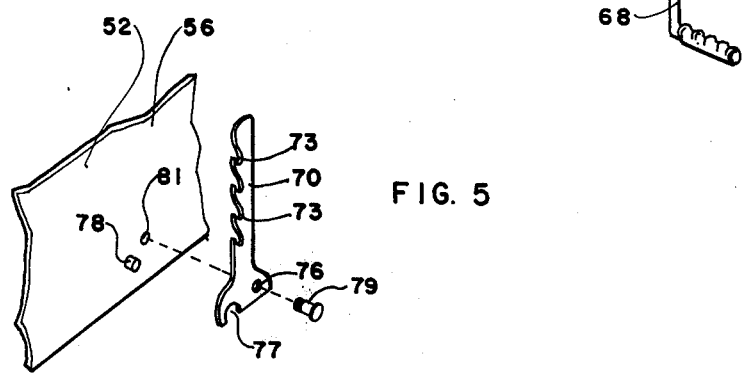
FIG. 5 is a detail perspective view of the rotisserie mounting bracket.

Detents 96 project from the face side of each burner unit 20 for engagement with holes 97 in the plates 35 of grill 30 when the burner units are mounted as shown in FIG. 4, side-by-side and the grill is unfolded so that one plate 35 is fastened to the face side of each burner unit.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A barbecue unit, the outer housing of which is shaped as a carrying case formed of a base section hinged to a cover section, said base and cover sections each shaped as an open box, with a pair of similar burner units each in the form of a box fitted with a grate unit as the face side of the burner unit, said boxes each formed with a side hinged to the remainder of the box, said burner unit boxes of a size so that the two boxes may be contained in side-by-side orientation in the base section of the housing and each of a height to extend beyond the rim of the base section in said orientation, means to fix said boxes in an erect position in spaced relation to each other inside the base section with the face side of each burner unit facing the other, and detachable means to mount a rotisserie bar to said base unit between said burner unit boxes in the erect position, together with a grill unit formed of a pair of grill plates hinged together, with one of said plates fitted with means to slidably engage the rotisserie bar in a non-rotatable fashion relative to said bar, said grill plates each fitted with first means to detachably latch the two grill plates together when said plates are folded in parallel array to each other, and with each grill plate fitted with second means to alternatively detachably engage each grill plate with the face side of an individual burner unit so that in the unfolded mode of the grill plates, and the side-by-side orientation of the burner unit boxes both grill plates extend in a substantially common plane over the face sides of the burner units, to which they are detachably fastened.

2. The combination as recited in claim 1 in which the cover section is hinged to the base section so that in the open mode of the cover section, the cover section extends above the rim of the base section and behind the base section, with the face of the open cover section extending in a plane substantially perpendicular to and behind the grate face of each burner units in either alternative position of use of said burner units.

* * * * *